(12) United States Patent
Lim et al.

(10) Patent No.: US 6,947,232 B2
(45) Date of Patent: Sep. 20, 2005

(54) USER DATA WEDGE MEDIA CERTIFICATION APPARATUS AND METHOD

(75) Inventors: TeckKhoon Lim, Singapore (SG); Myint Ngwe, Singapore (SG); KokHoe Chia, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 322 days.

(21) Appl. No.: 10/000,257

(22) Filed: Nov. 2, 2001

(65) Prior Publication Data

US 2002/0181131 A1 Dec. 5, 2002

Related U.S. Application Data

(60) Provisional application No. 60/286,804, filed on Apr. 26, 2001.

(51) Int. Cl.[7] .............................. G11B 27/36
(52) U.S. Cl. .......................... 360/31; 360/48; 360/53; 360/40
(58) Field of Search .................. 360/31, 75, 48, 360/40, 53, 57, 65, 25, 77.02; 324/210, 212; 714/710, 718

(56) References Cited

U.S. PATENT DOCUMENTS

| | | | |
|---|---|---|---|
| 5,563,746 A | * | 10/1996 | Bliss ............................ 360/53 |
| 5,812,755 A | | 9/1998 | Kool et al. |
| 5,818,654 A | | 10/1998 | Reddy et al. |
| 6,025,966 A | | 2/2000 | Nemazie et al. |
| 6,043,945 A | | 3/2000 | Tsuboi et al. |
| 6,052,348 A | | 4/2000 | Belser et al. |
| 6,101,227 A | | 8/2000 | Glover |
| 6,212,647 B1 | | 4/2001 | Sims, III et al. |
| 6,252,242 B1 | | 6/2001 | Brunfeld et al. |
| 6,295,176 B1 | * | 9/2001 | Reddy et al. .................. 360/51 |
| 6,384,999 B1 | * | 5/2002 | Schibilla ....................... 360/53 |
| 6,411,458 B1 | * | 6/2002 | Billings et al. ................ 360/25 |
| 2001/0026511 A1 | * | 10/2001 | Ueda et al. .............. 369/47.14 |
| 2002/0056054 A1 | * | 5/2002 | Yamamoto et al. ............. 714/8 |

* cited by examiner

*Primary Examiner*—David Hudspeth
*Assistant Examiner*—Natalia Figueroa
(74) *Attorney, Agent, or Firm*—David K. Lucente; Derek J. Berger

(57) ABSTRACT

Method and apparatus for detecting defects in a magnetic medium of a data handling system. The magnetic medium includes a number of user data wedges each disposed between an adjacent pair of servo data wedges. A predetermined data sequence is written to the user data wedges, and subsequently read to generate a readback signal. A sequence of discrete time sample values are generated from the readback signal. Defects in the medium are detected in relation to the magnitudes of the discrete time samples. A media scan controller outputs a first multi-bit information record having at least one bit composing the address of the user data wedge containing a defect, and a second multi-bit information record having at least one bit composing an address of the defect within the user data wedge. No information is written to the buffer when no defects are identified.

15 Claims, 7 Drawing Sheets

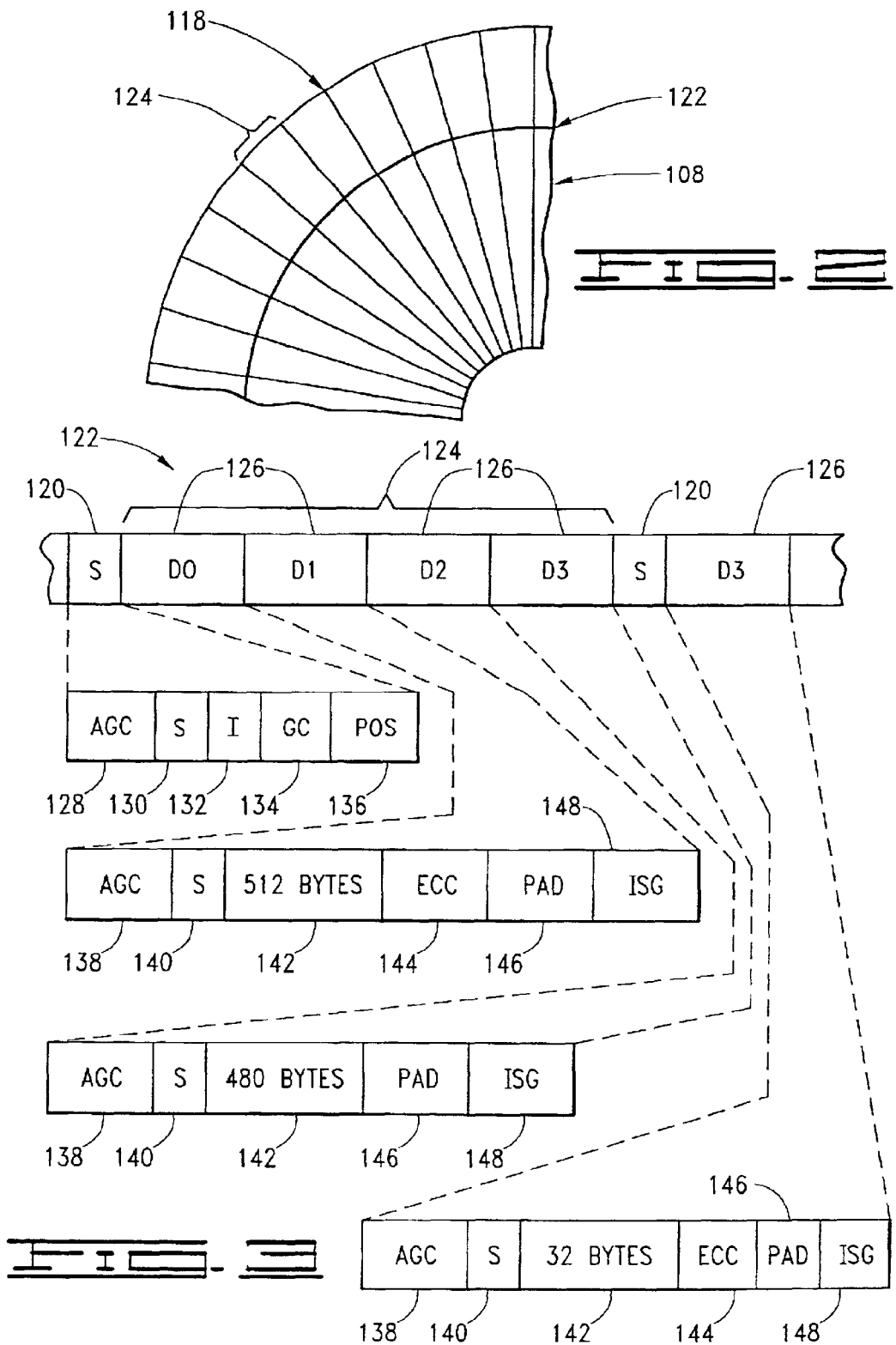

USER DATA WEDGE MEDIA CERTIFICATION APPARATUS AND METHOD

RELATED APPLICATIONS

This application claims priority to U.S. Provisional Application No. 60/286,804 filed Apr. 26, 2001.

FIELD THE INVENTION

The claimed invention relates generally to the field of data handling systems and more particularly, but not by way of limitation, to a method and apparatus for performing a media certification operation on data wedges on disc recording surfaces in a disc drive to detect and map media errors.

BACKGROUND

A disc drive is a data handling system used to store digital data. A typical disc drive includes a number of rotatable magnetic recording discs which are axially aligned and mounted to a spindle motor for rotation at a high constant velocity. A corresponding array of read/write heads are supported by a rotary actuator and used to access fixed sized data blocks (sectors) on tracks of the discs to write data to and to read data from the discs.

Digital data to be written to the disc recording surfaces are encoded and serialized to provide a sequence of time-varying write currents to the heads. The write currents induce a corresponding sequence of magnetic flux transitions (reversals) along the tracks. The data are subsequently read by transducing the magnetic flux transitions into pulses of an analog readback signal, which is subjected to decoding techniques to recover the originally written digital data. Disc drives of the present generation typically employ sampled amplitude read channels with discrete time sequence detection.

It is common to perform media certification tests to scan the disc surfaces for media defects during disc drive assembly operations. Broadly speaking, media defects are regions in the magnetic medium of the disc surfaces where data cannot be reliably written and retrieved. A number of factors can induce media defects including minute pinholes, asperities, contaminants, etc. induced in the discs during disc manufacturing.

With the continuing trend of providing ever increasing areal data storage densities on the disc recording surfaces, it is becoming increasingly difficult to produce discs with no media defects, and it is cost prohibitive to only use flawless discs and discard (scrap) discs containing such defects. Hence, disc drive manufacturers typically implement schemes to locate and map media defects so that such locations are subsequently avoided in the writing of user data. During a formatting operation in which the data sectors are defined on the disc surfaces, the disc drive will map out sectors that coincide with the location of the detected media defects so that data are not written to defective sectors.

At the same time, as areal data storage densities increase, the amount of time required to scan the disc recording surfaces for defects increases; not only in terms of the additional amounts of data that must be written and read back from the disc surfaces, but also in terms of the time required to process the test results and generate a defect list. There is a need, therefore, for improvements in the art whereby media certification can be performed in a disc drive data handling system in an efficient and reliable manner.

SUMMARY OF THE INVENTION

In accordance with preferred embodiments, a data handling system (disc drive) is provided in communication with a host device and includes a magnetic medium having a number of user data wedges each disposed between an adjacent pair of servo data wedges. The servo data wedges store servo control data and the user data wedges are configured to store user data in data sectors. Each user data wedge has a unique address in relation to angular position of the user data wedge on the magnetic medium.

Defects in the magnetic medium are identified by writing a predetermined sequence of data (such as a 2T oscillating pattern) to the user data wedges. The data are subsequently read from the user data wedges to generate a readback signal. A sequence of discrete time sample values are generated from the readback signal.

A defect in the magnetic medium is detected in relation to the magnitudes of the discrete time sample values. Upon detection of a media defect, a multi-bit information record is output to a buffer, the information record having at least one bit composing the address of the user data wedge containing the defect. A second multi-bit information record having at least one bit composing an address of the defect within the user data wedge containing the defect is also output to the buffer. Preferably, no information is output to the buffer when no defects are detected.

The information records are used to generate a defect list which is then used during a formatting operation in which user available data sectors are defined on the magnetic medium. In this way, defective sectors at locations of known defects are removed from use.

Since information records are preferably only placed in the buffer when media defects are detected, the time required to analyze the data records to identify the presence and location of defects is significantly reduced as compared to the prior art. Also, since the information records include embedded information as to the numeric address of the user data wedges containing defects, there is no need to search a large number of data records and count down to identify the particular data wedge (from index) containing each defect. Further, since the writing and reading of the data sequence do not require latency time to wait for the index point on the medium to first reach the head, significant time savings are achieved during the duration of the media certification operation.

These and various other features and advantages which characterize the claimed invention will be apparent from a reading of the following detailed description and a review of the associated drawings.

BRIEF DESCRIPTION OF THE DRAWINGS

FIG. 2 generally illustrates the manner in which servo data and user data are arranged on each of the disc surfaces of the disc drive of FIG. 1.

FIG. 3 illustrates the general format of each track defined on the disc surfaces.

DETAILED DESCRIPTION

Figure 1:
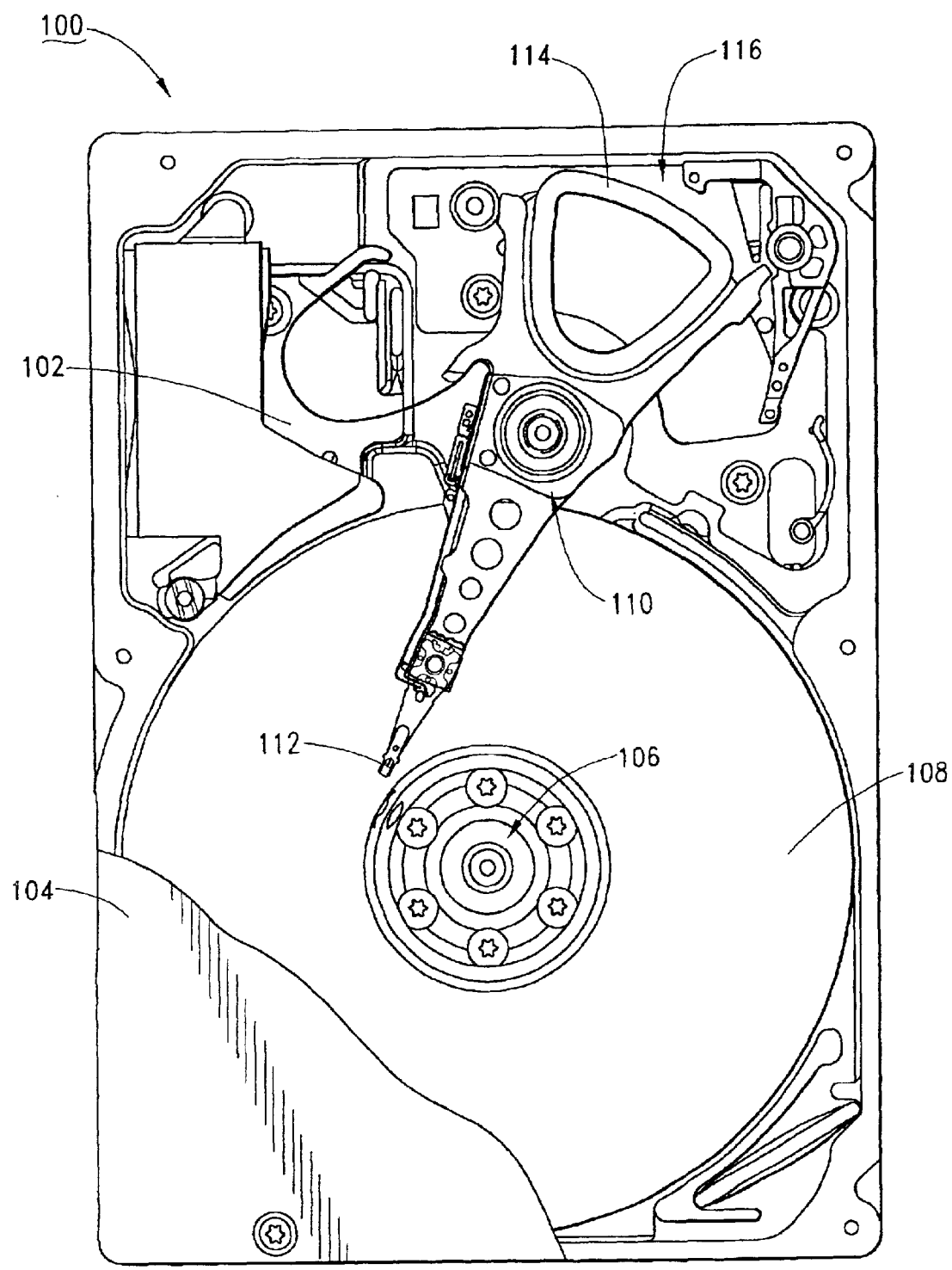
FIG. 1 is a top plan view of a disc drive data handling system constructed in accordance with preferred embodiments of the present invention.

FIG. 1 provides a top plan view of a disc drive data handling system 100 ("disc drive") constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 at a constant, high speed.

An actuator assembly 110 supports an array of read/write heads 112 adjacent the respective disc surfaces. The actuator assembly 110 is rotated through the application of current to an actuator coil 114 of a voice coil motor (VCM) 116. User data are stored by the heads 112 in fixed size data blocks (sectors) on concentric tracks defined on each of the disc surfaces.

FIGS. 2 and 3 generally illustrate the manner in which data are arranged on each of the recording surfaces of the discs 108. Servo data wedges 118 are written during disc drive manufacturing and radially extend across the recording surfaces like spokes on a wheel. Each servo wedge 118 is formed from a number of servo data fields 120 (FIG. 3), with one set of servo data fields 120 for each track 122. The servo data are used to detect and control the position of the heads 112. The number of servo data fields 120 per track varies depending upon the configuration of the drive, but a typical number is from about 100 to 300 servo data fields 120 on each track 122.

Data wedges 124 are provided between each adjacent pair of servo wedges 118. User data fields 126 (sectors) are subsequently defined in the data wedges 124 and are used to store user data in fixed size data blocks, such as 512 bytes.

The general format of each servo data field 120 and user data field 126 is shown in FIG. 3. Each servo data field 120 includes an automatic gain control (AGC) field 128, a synchronization field 130, an index field 132, a Gray code (track address) field 134, and a position (POS) field 136. The AGC field 128 provides an oscillating preamble signal (such as a 2T pattern) to prepare servo control circuitry for receipt of the remaining servo data. The synchronization field 130 signals the presence of a servo data field 120 by storing a unique synchronization pattern that is a selected Hamming distance away from other possible combinations of bit patterns on the disc. The index field 132 indicates angular position of the servo data field 120 on the disc 108 with respect to an index point (i.e., zero rotational degrees). The Gray code field 134 provides a radial track address for the track 122, and the position field 136 enables the servo control circuitry to detect intra-track location of the head 112.

The user data fields 126 labeled D0, D1 and D2 are contiguous data fields and each include an AGC field 138, a synchronization field 140, a user data field 142 (in which 512 bytes of user data are stored), an error correction code (ECC) field 144 in which error detection and correction codes are stored, a pad field 146 and an intersector gap 148.

The user data field D3 is a non-contiguous, or split-sector data field 126 since a servo data field 120 splits the data field D3 into two parts. The use of split-sectors increases the available data storage of the disc drive. The first portion of the user data field D3 in FIG. 3 has a user data field 142 that stores 480 bytes of user data, and the second portion has a user data field 142 that stores the remaining 32 bytes of user data. Of course, other split-sectors on the disc 108 may have a different distribution of the user data bytes between the two halves depending upon the width of the data wedge 124.

Figure 4:
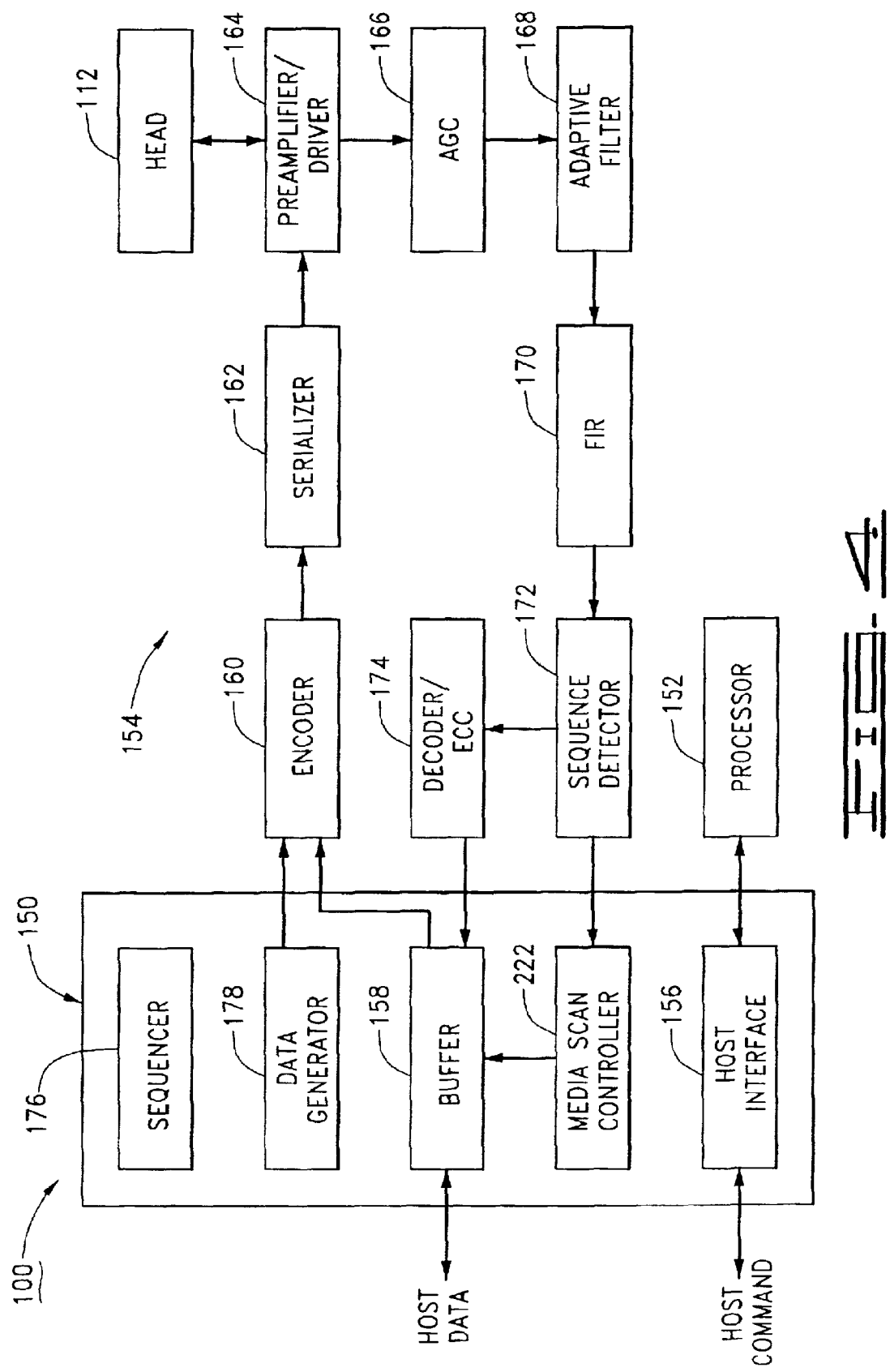
FIG. 4 is functional block diagram of relevant portions of the disc drive of FIG. 1.

FIG. 4 provides a functional block diagram of relevant circuitry of the disc drive 100 including an interface circuit 150, processor 152 and read/write channel 154. The interface circuit 150 communicates with a host device in accordance with an industry standard protocol, such as Small Computer Systems Interface (SCSI). The processor 152 provides top level control of the disc drive 100. The read/write channel 154 operates to write data to the discs 108 and to recover previously written data from the discs 108. For reference, the read channel portion of the read/write channel 154 is contemplated to use partial response, maximum likelihood (PRML) detection, although such is not limiting to the scope of the claimed invention.

During a normal data write operation, the host provides a write command to a host interface circuit 156 of the interface circuit 150 and loads the data to be written to a data buffer 158. The data are encoded by an encoder circuit 160 to provide run length limited (RLL) and error correction encoding, and the encoded data are serialized by a serializer 162. The output of the serializer 162 constitutes a non-return to zero (NRZ) signal used by a preamplifier/driver circuit 164 (preamp) to apply bi-directional write currents to the selected head 112 to write the data as a sequence of magnetic flux transitions on the disc recording surface.

During a subsequent data read operation, the data are transduced from the disc surface by the head 112 to provide a readback signal that is preamplified by the preamp 164, normalized by an AGC circuit 166 and filtered by an adaptive filter 168. The filtered signal undergoes time-domain filtering to a selected class of partial response waveforms (e.g., EPR4) by a finite response filter (FIR) 170. A sequence (Viterbi) detector 172 samples the output of the FIR 170 to provide a sequence of data values representative of the encoded data written to the disc 108.

A decoder 174 removes the RLL encoding and applies on-the-fly error detection and correction to provide the recovered user data to the buffer 158 for subsequent transfer to the host device. A sequencer 176 asserts read and write gate signals to control the writing and reading of data by the read/write channel 154.

Figure 5:
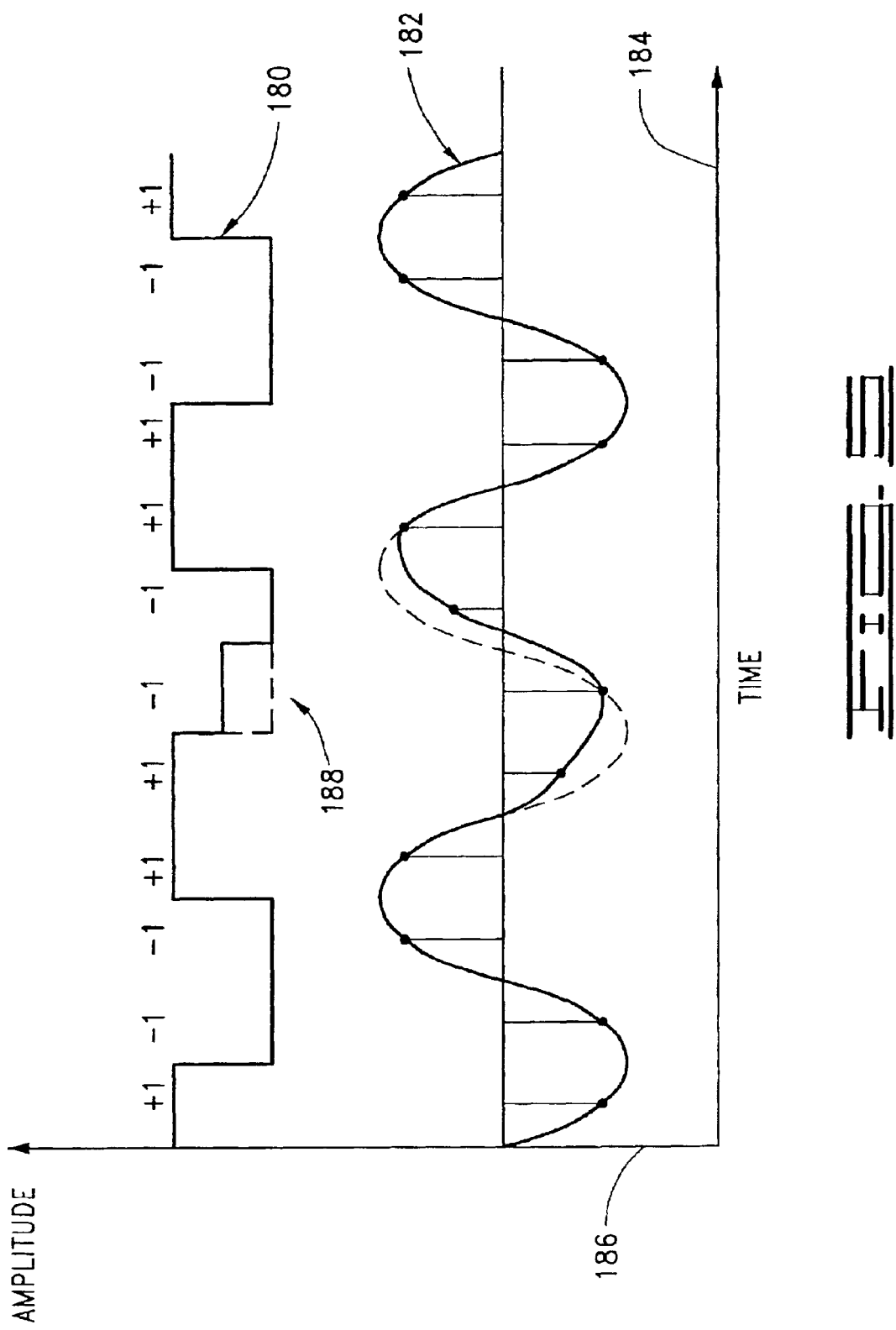
FIG. 5 is a graphical representation of a 2T signal written to a selected track and a resulting readback sinusoidal signal when a media defect occurs.

The interface circuit 150 further comprises a data generator 178 which generates a 2T oscillating pattern for use at selected times including during a media certification operation during disc drive assembly operations. During media certification, the 2T pattern is written across the entire width of each data wedge 124 on each disc surface. FIG. 5 provides a graphical representation of a 2T pattern waveform 180 (in NRZ format) and a corresponding readback signal 182, both plotted against an elapsed time x-axis 184 and an amplitude y-axis 186. Under normal conditions, the 2T pattern will provide well behaved readback signal characteristics, as shown. However, the presence of a media defect, such as indicated at point 188, will provide a corresponding shift in the sample magnitude values of the readback signal. Such defects can be detected in relation to the sampled data values obtained during readback.

Figure 6:
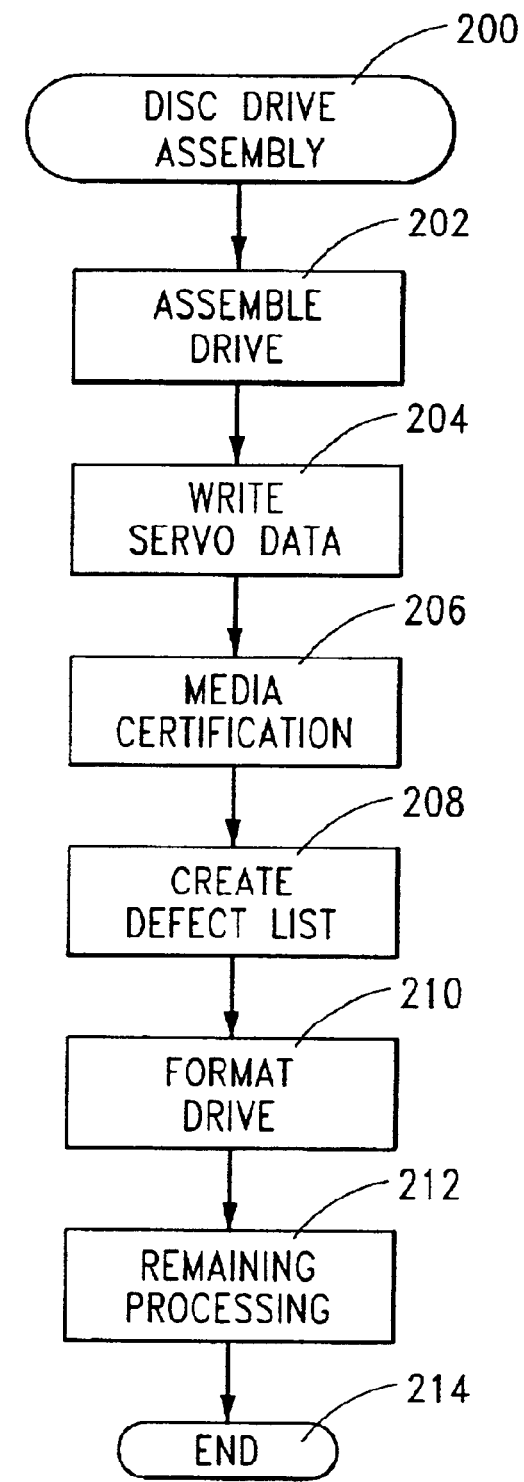
FIG. 6 is a flow chart for a DISC DRIVE ASSEMBLY routine generally illustrating the manner in which the disc drive of FIG. 1 is assembled and tested during disc drive manufacturing operations.

FIG. 6 provides a DISC DRIVE ASSEMBLY routine 200 illustrative of steps carried out in accordance with preferred embodiments to assemble and test the disc drive 100, including the aforementioned media certification. The disc drive 100 is initially assembled at step 202. The servo data in the servo data wedges 118 (FIG. 2) are written to the disc surfaces at step 204 during a servo track writing operation.

The routine proceeds with a media certification operation at step 206 to identify locations on the disc surfaces having media defects. A defect list is generated at step 208 from the results of the media certification operation, and this defect list is used during a formatting operation at step 210 in which the user data fields 126 are formed. The defect list enables the drive to avoid making user data fields 126 available for use at locations corresponding to the detected defects. Once the drive is formatted, the routine continues to step 212 for remaining processing including parametric configuration and extended temperature cycling testing. At the conclusion of such processing, the drive is ready for shipment and the routine ends at step 214.

Figure 7:
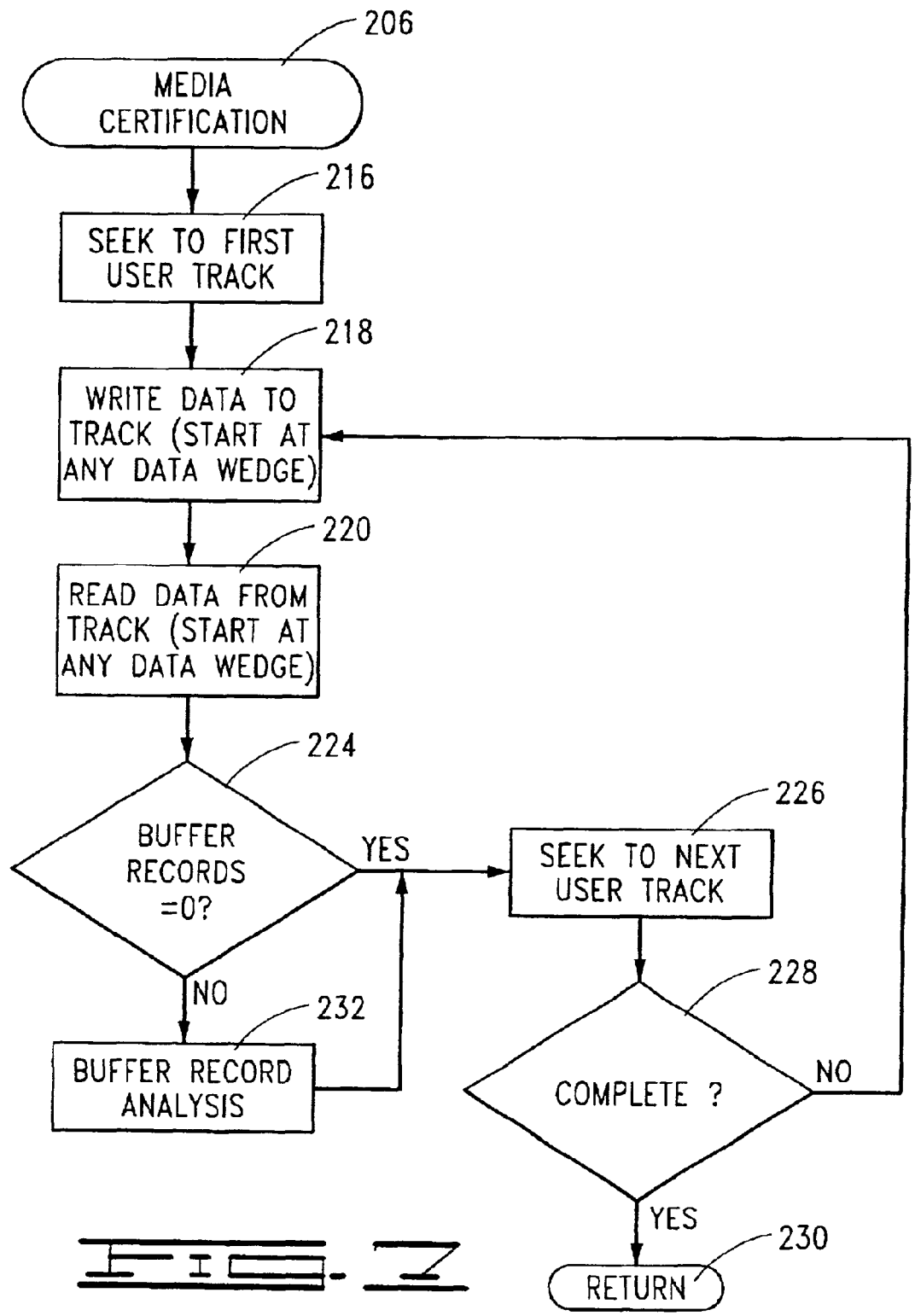
FIG. 7 is a flow chart for a MEDIA CERTIFICATION routine illustrating steps carried out in accordance with preferred embodiments of the present invention to check the disc recording surfaces for media defects.

The media certification of step 206 of FIG. 6 is set forth in greater detail by the flow of FIG. 7. At step 216, a seek is performed to move the first selected head to the first user data track 122. Once the head is over the first user data track, a 2T pattern is written to each of the data wedges 124 of the track at step 218 using the data generator 178. It will be noted that the writing of the 2T pattern begins at any of the data wedges 124 on the track 122 and does not require latency time to wait for the first data wedge after the index point to reach the head 112. It will be noted that other patterns besides a 2T pattern, such as a direct current (DC) erase signal, can readily be used as desired.

After the 2T pattern data have been written to each of the data wedges 118 on the track 122, the 2T pattern data are subsequently read at step 220. The reading preferably commences immediately upon completion of the writing of the data at step 218, so that the reading step can also begin at any data wedge 124 on the disc 108 without the need to wait for the index point to reach the head 112. This is in contrast to the prior art which typically requires waiting for the index point to be reached before certification data are written and read.

The time savings achieved from the present approach can be significant. For example, if the spindle motor 106 rotates the discs at 7,200 revolutions per minute, a full latency period (one revolution) will consume 8.33 milliseconds (8.33 ×10$^{-3}$ seconds). For a two disc, four surface drive with 50,000 tracks per surface, and assuming each new track would require half a latency period (on average) before commencing writing and reading of data if the index point had to be identified first, the routine of FIG. 7 would eliminate about 14 minutes of test time per drive as compared to the prior art. This savings can be significant in a high volume manufacturing environment where a very large number of nominally identical drives are manufactured each day.

Continuing with step 220 of FIG. 7, a media scan controller circuit 222 ("controller") in the interface circuit 150 (FIG. 4) monitors the output of the sequence detector 172 for defects, such as shown at 188 in FIG. 5, through the application of appropriate thresholds to the sample values output from the sequence detector 172. The controller 222 uses a byte counter (not separately shown) to track position from the most recent servo sync pattern (field 130, FIG. 3) and writes defect data records to the buffer 158 in response to the detection of defects. Each data record is preferably a 16 bit value having the format shown in Table 1 (LSB, MSB):

TABLE 1

| Bit: | 7 | 6 | 5 | 4 | 3 | 2 | 1 | 0 | 15 | 14 | 13 | 12 | 11 | 10 | 9 | 8 |
|---|---|---|---|---|---|---|---|---|---|---|---|---|---|---|---|---|

The following is an explanation of the informational content of these bits. When set, bit 15 is a header bit indicating that a new data wedge 124 contains at least one media defect. The wedges are numbered from the index point (indicated by index field 132, FIG. 3). For example, if there are a total of 288 servo wedges 118 and data wedges 124 on each disc surface, the data wedges 124 will be consecutively numbered 0 to 287 from the index point. Thus, if bit 15 is set, bits 9:0 (9 to 0) identify the particular wedge number in error. Bits 14:10 are not relevant (i.e., "don't care" bits) and no reference is made to these bits in interpreting the data record.

When bit 14 of the data record is set (and bit 15 is not set), then bits 12:0 of the data record indicate the location (byte) of a media defect within the data wedge 124 (counting from the first byte location of the data wedge). When bit 13 is set (and bit 15 is not set), then bits 12:0 of the data record minus one is the location (byte) of a media defect within the data wedge.

Some example data records will help illustrate the above format. Assume the first data record placed into the buffer during step 220 has a value of 79D8$_H$. This value corresponds to the binary sequence {0111 1001 1101 1000}. Bit 15 is set=1, and bits 9:0 have the value {00 0111 1001}= 121$_{10}$. Thus, the data record 79D8$_H$ indicates that data wedge=121 contains at least one media defect.

Assume the next data record has a value 3661$_H$. This corresponds to the binary sequence {0011 0110 0110 0001}. Bit 15=0, bit 14=1 and bit 13=1. Bits 12:0 have the value {0 0001 0011 0110}=310$_{10}$. Thus, Bytes 309 and 310 in the 121$^{st}$ data wedge have detected media defects.

Finally, assume the next data record in the sequence has a value ED42$_H$. This corresponds to the binary sequence {1110 1101 0100 0010}. Bit 15 is set=0, bit 14 is set=1, and bit 13 is set=0. Bits 12:0 have the value {0 0010 1110 1101}=749$_{10}$. This means that the 749$^{th}$ byte in the 121$^{st}$ data wedge has a detected media defect.

The operation of step 220 in FIG. 7 will thus continue until all of the data wedges 124 of the selected track are read. Decision step 224 inquires whether any buffer records were provided to the buffer 158 by the controller 222; if not, the disc drive 100 seeks to the next user track at step 226. Decision step 228 inquires whether all user tracks have been evaluated. If so, the process is complete and the routine returns to the flow of FIG. 6 at step 230; if not, the routine returns back to step 218 for evaluation of the new user track.

Figure 8:
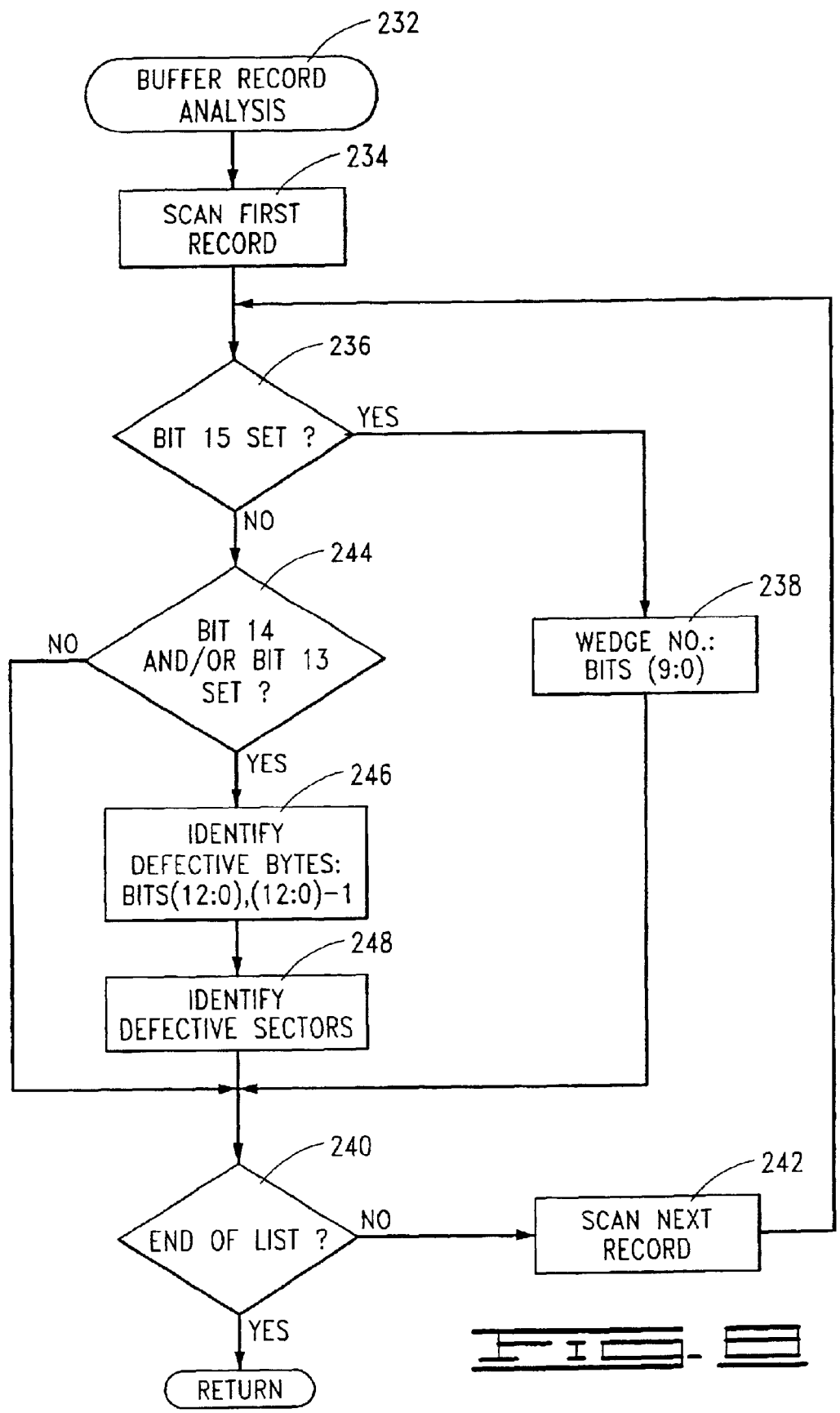
FIG. 8 is a flow chart for a BUFFER RECORD ANALYSIS routine illustrating steps carried out during the routine of FIG. 7.

When buffer records are present in the buffer, however, the flow of FIG. 7 continues to a buffer record analysis routine 232, as set forth more fully by FIG. 8. The buffer record analysis routine proceeds to scan the first record in the buffer 158 at step 234. Decision step 236 inquires whether bit 15 is set (i.e., bit 15=1); if so, the flow proceeds to step 238 and the data wedge number is identified by bits (9:0) in the data record. The flow passes to decision step 240 which inquires whether the end of the list of records in the buffer has been reached. If not, the routine passes to step 242 wherein the next record is scanned and the flow returns to step 236.

When bit 15 is not set, the flow passes from decision step 236 to step 244 which determines whether bit 14 and/or bit 13 are set. If so, the locations of the defective bytes are determined from bits (12:0) in the data record at step 246. It will be recalled that bits (12:0) identify a defective byte when bit 14 is set, and bits (12:0)–1 identify a defective byte when bit 13 is set. The corresponding defective sector(s) that line up with the defective bytes are next identified at step 248. This can be accomplished through the use of a sector map indicating what portions of the various data wedges 122 correspond to which sectors 126.

The flow of FIG. 8 continues until all of the data records in the buffer 158 have been evaluated, after which the routine returns to the flow of FIG. 7 at step 248.

It will be noted that data records are placed into the buffer 158 only when media defects are detected, unlike prior art techniques that place a header record into the buffer for each data wedge 124 regardless whether defects are present in each wedge. This significantly reduces the number of data records that require analysis to identify the presence of detected media defects. A related advantage is the embedding of the particular data wedge number in the header records (i.e., the records in which bit 15=1); this eliminates the need to search a large number of data records and count down to identify the particular data wedge (from index) containing each defect. It is contemplated that the analysis of FIG. 8 requires significantly fewer processing resources to complete and thus provides substantial time savings over prior art defect management techniques.

It will now be understood that the present invention (as embodied herein and as claimed below) is directed to an apparatus and method for detecting defects in a magnetic medium of a data handling system.

In accordance with preferred embodiments, a disc drive (such as 100) includes a magnetic medium (such as 108) having a number of user data wedges (such as 124) each disposed between an adjacent pair of servo data wedges (such as 118). The servo data wedges store servo control data and the user data wedges are configured to store user data in data sectors (such as 126). Each user data wedge has a unique address in relation to angular position of the user data wedge on the magnetic medium.

Defects in the magnetic medium are identified by writing a predetermined sequence of data to the user data wedges (such as by step 218). The data are subsequently read from the user data wedges to generate a readback signal (such as by step 220). A sequence of discrete time sample values are generated from the readback signal (such as by 172). A defect in the magnetic medium is detected in relation to the magnitudes of the discrete time sample values. A multi-bit information record is output to a buffer (such as 158), the information record having at least one bit composing the address of the user data wedge containing the defect. Preferably, a second multi-bit information record having at least one bit composing an address of the defect within the user data wedge containing the defect is also output to the buffer, and no information is output to the buffer when no defects are detected.

The predetermined sequence of data preferably comprises a 2T oscillating pattern. Further, a selected servo data wedge corresponds to an index point as an angular reference for the magnetic medium, a selected servo data wedge immediately precedes a first user data wedge, and the reading of the data commences at a selected data wedge other than the first user data wedge on the magnetic medium.

The method further preferably includes a step of formatting the data handling system to form a plurality of user available data sectors in the user data wedges for subsequent use in storing user data, wherein a user available data sector is not formed over a defect (such as by step 210).

In accordance with other preferred embodiments, a data handling system (such as 100) comprises a magnetic medium (such as 108) having a number of user data wedges (such as 124) each disposed between an adjacent pair of servo data wedges (such as 118), the servo data wedges storing servo control data and the user data wedges configured to store user data in data sectors (such as 126). Each user data wedge having a unique address in relation to angular position of the user data wedge on the magnetic medium.

The data handling system further comprises a head (such as 112) which writes a predetermined sequence of data to the user data wedges and subsequently reads the data from the user data wedges to generate a readback signal; a read channel (such as 154) which generates a sequence of discrete time sample values from the readback signal; a data buffer (such as 158) configured to temporarily store data during transfer between the magnetic medium and a host device; and a media scan controller (such as 222) which identifies a defect in the magnetic medium in relation to the discrete time sample values and outputs to the data buffer a multi-bit information record having at least one bit composing the address of the user data wedge containing the defect.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the media certification routine while maintaining the same functionality without departing from the spirit and scope of the invention.

In addition, although the embodiments described herein are generally directed to a media certification routine for a disc drive, it will be appreciated by those skilled in the art that the routine can be used for other types of data handling systems, such as optical disc systems, without departing from the spirit and scope of the claimed invention.

What is claimed is:

1. A method comprising scanning consecutive data wedges on a data storage medium for defects by transducing a readback signal from said wedges beginning at a wedge non-adjacent an angular index reference position and identifying a defect location on the medium from said readback signal.

2. The method of claim 1, wherein the scanning step further comprises generating a multi-bit informational record having at least one bit composing an address of a selected data wedge in which the defect location is disposed.

3. The method of claim 2, wherein the scanning step further comprises generating a second multi-bit informational record having at least one bit composing an address of the defect location within the selected data wedge.

4. The method of claim 1, wherein the scanning step further comprises a prior step of writing a 2T oscillating pattern to the data wedges.

5. The method of claim 1, wherein the data storage medium comprises a rotatable magnetic recording disc.

6. The method of claim 1, wherein the scanning stop further comprises generating a sequence of discrete time sample values from the readback signal and identifying the defect location in relation to said sequence.

7. The method of claim 1, further comprising a step of subsequently formatting the data storage medium to form a plurality of user available data sectors in the data wedges for subsequent use in storing user data, wherein a user available data sector is not formed over the defect location identified during the scanning step.

8. The method of claim 1, wherein the data storage medium further comprises angularly spaced, radially aligned servo wedges between which the data wedges are disposed, the servo wedges comprising servo fields that define a plurality of concentric tracks on the medium, and wherein the scanning step further comprises sequentially positioning a data transducer over an initial track to scan the data wedges thereon, advancing the data transducer to the next adjacent track and commencing scanning the data wedges thereon without waiting for the angular index reference position to reach the data transducer, and repeating until all of the plurality of concentric tracks on the data storage medium have been scanned.

9. An apparatus comprising:
a data storage medium comprising consecutive data wedges and an angular index reference position defined thereon; and
a media scan controller which scans the data wedges for defects by transducing a readback signal from said wedges beginning at a wedge non-adjacent the angular index reference position and by identifying a defect location on the medium from said readback signal.

10. The apparatus of claim 9, wherein the media scan controller further generates a multi-bit information record having at least one bit composing an address of a selected data wedge containing the defect location.

11. The apparatus of claim 10, wherein the media scan controller further generates a second multi-bit information record having at least one bit composing an address of the defect location within the selected data wedge.

12. The apparatus of claim 9, wherein the media scan controller prewrites a predetermined sequence of data comprises a 2T oscillating pattern to the data wedges prior to scanning the data wedges for defects.

13. The apparatus of claim 9, wherein the data storage medium comprises a rigid, rotatable magnetic recording disc.

14. The apparatus of claim 9, further comprising an interface controller which subsequently formats the data storage medium to form a plurality of user available data sectors in the data wedges for subsequent use in storing user data, wherein a, user available data sector is not formed over the defect location identified by the media scan controller.

15. The apparatus of claim 9, wherein the data storage medium further comprises angularly spaced, radially aligned servo wedges between which the data wedges are disposed, the servo wedges comprising servo fields that define a plurality of concentric tracks on the medium, and wherein the media scan controller sequentially positions a data transducer over an initial track to scan the data wedges thereon, advances the data transducer to the next adjacent track and commences scanning the data wedges thereon without waiting for the angular index reference position to reach the data transducer, and repeats until all of the plurality of concentric tracks on the data storage medium have been scanned.

* * * * *